United States Patent

[11] 3,629,539

| [72] | Inventor | Daniel F. T. Roberts<br>Baxley, England |
|---|---|---|
| [21] | Appl. No. | 14,292 |
| [22] | Filed | Feb. 26, 1970 |
| [45] | Patented | Dec. 21, 1971 |
| [73] | Assignee | Foster Wheeler Corporation<br>Livingston, N.J. |
| [32] | Priority | Feb. 26, 1969 |
| [33] | | Great Britain |
| [31] | | 10,405/69 |

[54] BORE WELDING
4 Claims, 2 Drawing Figs.

[52] U.S. Cl. .................................................. 219/60 A,
                    73/40.7, 219/61, 219/125 PL
[51] Int. Cl. ........................................................ B23k 9/02
[50] Field of Search ............................................ 219/124,
                    125 RA, 60 A, 60 R, 61, 137; 73/40.7

[56] References Cited
UNITED STATES PATENTS

| 3,084,243 | 4/1963 | Gotch ........................... | 219/125 X |
| 3,159,734 | 12/1964 | Cooksey et al. ............... | 219/125 |
| 3,395,263 | 7/1968 | Kazlauskas ................... | 219/125 |
| 3,426,175 | 2/1969 | Hahne ........................... | 219/125 |

Primary Examiner—J. V. Truhe
Assistant Examiner—L. A. Schutzman
Attorneys—John Maier, III, Marvin A. Naigur and John E. Wilson

ABSTRACT: This invention relates to the correct positioning of the nonconsumable electrodes of inert gas shielded arc welding torches. According to the invention a welding torch is provided with probe means comprising a jet of an inert gas. Inert gas is supplied to this jet and the back pressure or flow rate of this gas is measured to align the jet with the joint to be welded. Once the jet has been aligned with the joint, the electrode is at a position relative to the torch which is known from the construction of the torch and so can be accurately positioned relative to the joint ready for welding.

PATENTED DEC 21 1971 3,629,539

BORE WELDING

This invention relates to the welding of two parts, in particular the invention relates to a method of welding two parts and a welding torch for use in this method.

BACKGROUND OF THE INVENTION

The torch described in our 7 Kingdom Pat. No. 934,485 has been highly successful in practice and a very large number of welds have been made using it. It is, however, very important that the electrode be at the correct position relatively to the joint and in internal bore welding it is of course impossible to set the correct position by eye.

In welding tubes to tube plates this has involved making the torch stem of a known accurate length and accurately machining the rear face of the tube plate. Then, when the torch stem is inserted into the bore until the torch body abuts the rear face of the plate, the electrode is in the correct position relative to the joint. As noted above very good results can be achieved in this way but if the accurate machining of the rear face of the tube plate could be avoided this would be an advantage.

Another approach has been to insert the torch until the electrode contacts the weld preparation, and then set the electrode a known amount from this position. The contact between the electrode tip and the joint can lead to damage and/or contamination of the electrode and this is unsatisfactory if accurate and good welds are to be achieved.

The invention has been made with these points in mind.

THE INVENTION

According to the invention there is provided a method of welding a joint between two parts using a nonconsumable electrode inert gas shielded welding torch in which the parts to be joined are spaced apart so as to leave a small gap between themselves, the welding torch being provided with probe means for detecting the position of this gap, the probe means comprising a jet of inert gas, in which the torch is moved relative to the parts and the back pressure or flow rate of the jet is measured to determine changes corresponding to the alignment of the jet with the gap until the jet is aligned with the gap, this alignment placing the electrode in a position relative to the gap which is known from the construction of the torch, and after which the weld is run with the electrode correctly positioned relative to the joint for welding.

Thus the construction of the torch may be such that, when the gas jet is aligned with the gap, the electrode is in the correctly aligned position relative to the joint for welding. Alternatively, it may be that, when the gas jet is aligned with the gap, the torch must be moved one way or the other by a known amount so as to bring the electrode to the correctly aligned position relative to the joint for welding.

The invention is particularly, though not exclusively, useful in the internal bore welding of tubular parts. When welding such parts the two parts can conveniently be spaced apart so as to leave the small gap by means of an interposed annular filler ring which becomes fused during welding and incorporated in the joint.

The invention also extends to inert gas shielded arc welding torch suitable for use in the above method comprising a torch body having projecting from it a rotatable stem carrying a nonconsumable electrode, the stem also having a nozzle directed substantially radially outward from the stem, means being provided for feeding an inert gas to the nozzle, and pressure or flow measuring means being provided for detecting the heat-pressure or the rate of flow of the inert gas flowing out through the nozzle.

By following the invention one can very simply locate the gap in the joint relative to the electrode and so accurately position the latter to make the weld without having to machine the rear face of the tube plate accurately.

The invention can be applied to existing designs of bore welding torch such as, for example, the one described in our U.K. Pat. No. 934,485 or in our copending U.K. Pat. application No. 10404/69.

The inert gas used as the probe means can conveniently be argon or other shielding gas used to shield the arc regions.

DESCRIPTION OF THE DRAWINGS

An embodiment of the invention will now be illustrated, by way of example, with reference to the accompanying diagrammatic drawings in which.

DESCRIPTION OF THE PREFERRED EMBODIMENT

Figure 1:
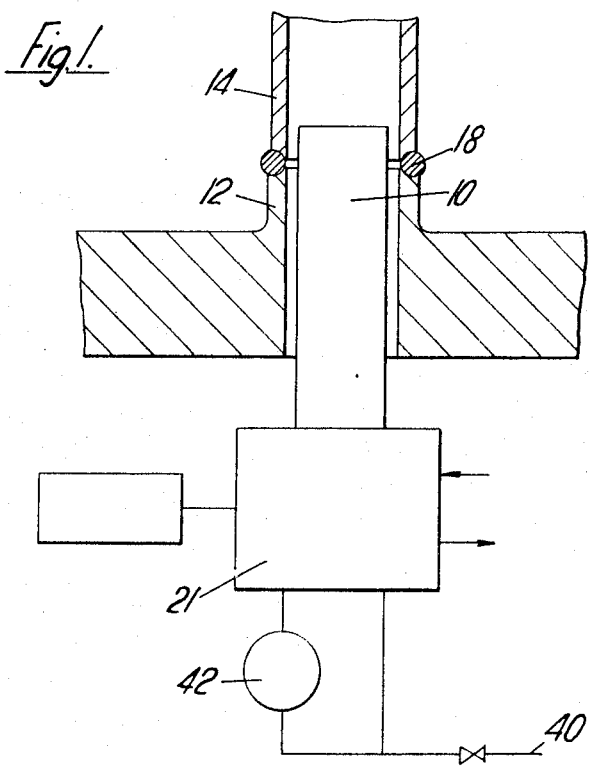
FIG. 1 is a schematic diagram illustrating the operation of a torch according to the invention.

The stem 10 of the torch is shown positioned within the bore of two tubular parts 12 and 14 to be welded together. The ends of the latter having been given recessed annular preparations 16 and they are separated by a filler ring insert 18 so as to leave a small gap 20 between their inwardly directed faces. The gap can suitable be up to about 0.03 inch.

The filler ring insert provides a reserve of material which when melted by the heat of the arc fills the gap 20 and provides a smooth continuous welded contour to the joint. The material of the insert 18 will be of material compatible with the materials of the parts 12 and 14 and can contain materials which give desirable mechanical properties to the joint. The size and shape of the insert need not be as shown in the drawing.

Figure 2:
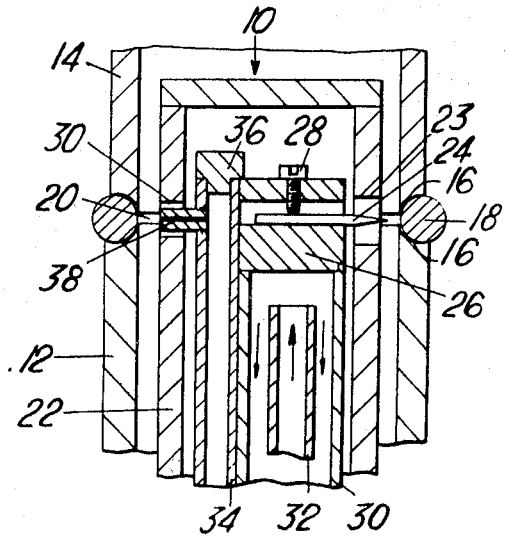
FIG. 2 is an enlarged axial section showing the outer end of the stem of the welding torch according to the invention positioned within two tubular parts to be welded together.

The construction of the welding torch is basically similar to the torch shown and described in our U.K. Pat. No. 934,485 and reference is made to that patent for a complete description of the torch body 21 and stem. In the torch according to the invention, the welding stem 10 comprises as shown in FIG. 2 an outer ceramic tube 22 through a hole 23 in which a nonconsumable tungsten electrode 24 extends. The electrode is mounted in a copper block 26 by means of a screw 28, the block fitting in the end of an inner tube 30. The latter defines with a smaller tube 32 a path for water cooling in the direction of the arrows which keeps the electrode cool. Inert shielding gas flows through the annular space between the tubes 22 and 32 and flows out through the hole 23 so as to blanket the arc region.

Also positioned within the stem 10 between the tubes 22 and 32 is an inert gas supply conduit in the form of a tube 34 which is closed at its outer end by a plug 36. A nozzle tube 38 is screwed into the tube 34 and extends through a hole 40 in the wall of the tube 22.

Inert shielding gas is supplied to the tube 34 from a supply lead 40 (FIG. 1) flows out in a small jet through the nozzle tube 38. The back pressure of the gas in the tube 34 is measured by a pressure-measuring device 42 (FIG. 1). As will be realized the jet of gas impinges on the walls of the parts 12 and 14 and this impingement gives a measurable back pressure to the stream of gas. When, however, the jet of gas is aligned with the gap 20 a marked drop in this back pressure will occur.

Thus in operation, the stem 10 is inserted into the bores of the parts 12 and 14 to be joined and the back pressures of the gas jet measured by the measuring device 42. The point where this pressure shows a marked drop is when the gas jet is aligned with the gap 20 and so one can immediately locate the position of this gap. In the torch shown the nozzle tube 38 and electrode 24 are approximately aligned and the design of the torch is such that when the gas jet is aligned with the gap 20 the electrode will be in the correct aligned position to make the bore weld. This is then effected in the normal way as described in our above United Kingdom patent.

It may well be, however, that the construction of the torch is such that when the gas jet is aligned with the gap 20 the stem must be moved a known amount into or out from the parts 12 and 14, to get the electrodes in the correction position for making the weld.

In either case, however, the position of the joint can be accurately located and the electrode accurately aligned for welding without accurate measurement or machining of the part 12, and also without risk of damage or contamination of the electrode.

An important advantage of the invention is its great simplicity.

A latitude of modification, change, and substitution is intended in the foregoing disclosure and in some instances some features of the invention will be employed without a corresponding use of other features. Accordingly it is appropriate that the appendant claims be construed broadly and in a manner constant with the spirit and scope of the invention herein.

I claim:

1. A method of internal bore welding wherein the parts to be welded are spaced apart to have a gap between them, said gap encircling the common axis of the bores, comprising the steps of:
   a. jetting inert gas against the sidewall of one of said bores,
   b. moving the jet stream axially of said bores until the back pressure thereof is reduced, because of the flow of said stream in said gap,
   c. moving a welding torch axially of said bores until the electrode thereof is aligned with said stream, and
   d. rotating said electrode about said axes to weld said parts at said gap.

2. The method defined in claim 1 comprising the further step of directing shielding gas into said gap in the vicinity of said electrode as said electrode is rotated about said axis, said shielding gas being the same composition as said inert gas.

3. A welding torch for internal bore welding wherein the parts to be welded are spaced apart to leave a gap between them, said gap encircling the common axis of said bores, comprising:
   a torch body,
   a rotatable stem projecting from said body,
   means to rotate said stem relative to said body,
   a nonconsumable electrode mounted on said stem,
   a nozzle on said stem axially aligned with said electrode,
   an inert gas supply conduit in said stem for supplying gas to said nozzle, and
   a pressure-measuring device for indicating a drop in the back pressure of said gas when said gas is being directed against the sidewall of one of said bores and said torch is being moved axially to thereby indicate when said nozzle and electrode are aligned with said gap.

4. The welding torch defined in claim 3, wherein said electrode extends perpendicular to said stem.

* * * * *